United States Patent
Lenoir et al.

(10) Patent No.: US 6,924,408 B2
(45) Date of Patent: Aug. 2, 2005

(54) METHOD FOR REDUCING POLYCHLORINATED DIBENZODIOXINS AND -FURANS IN EXHAUST GAS

(75) Inventors: Dieter Lenoir, Munich (DE); Petros Samaras, Thessalonike (GR); Karl-Werner Schramm, Munich (DE); Antonius Kettrup, Ansbach (DE)

(73) Assignee: GSF Forshungszentnem für Umwelt und Gesundheit GmbH, Oberschleissheim (DE)

(*) Notice: Subject to any disclaimer, the term of this patent is extended or adjusted under 35 U.S.C. 154(b) by 394 days.

(21) Appl. No.: 10/131,800

(22) Filed: Apr. 19, 2002

(65) Prior Publication Data

US 2002/0160324 A1 Oct. 31, 2002

Related U.S. Application Data

(63) Continuation-in-part of application No. PCT/EP00/10697, filed on Oct. 31, 2000.

(30) Foreign Application Priority Data

Nov. 6, 1999 (DE) .......................... 199 53 418

(51) Int. Cl.$^7$ ................................. A62D 3/00
(52) U.S. Cl. ................. 588/207; 423/240 R; 423/245.1
(58) Field of Search ................... 588/207, 209, 588/211, 244; 423/240 R, 245.1

(56) References Cited

U.S. PATENT DOCUMENTS 5,113,772 A 5/1992 Karasek et al.

FOREIGN PATENT DOCUMENTS

DE 40 27 819 3/1992
EP 0 435 848 A 7/1991

*Primary Examiner*—Stanley S. Silverman
*Assistant Examiner*—Edward M. Johnson
(74) *Attorney, Agent, or Firm*—Klaus J. Bach

(57) ABSTRACT

In a method for reducing the content of polychlorinated dibenzodioxins and -furans in the exhaust gas of chemical high temperature processes handling process materials, amides or organic oxides are made available to the process under the conditions under which the polychlorinated dibenzodioxins and -furans are generated, which amides comprise of at least one of the group consisting of amidosulfonic acid, hydroxyl amino sulfonic acid and sulfamid in an amount of 0.5 to 10% of the process material.

7 Claims, No Drawings

METHOD FOR REDUCING POLYCHLORINATED DIBENZODIOXINS AND -FURANS IN EXHAUST GAS

This is a Continuation-In-Part application of international patent application PCT/EP00/10697 filed Oct. 31, 2000 and claiming the priority of German application No. 199 53 418.7 filed Nov. 6, 1999.

BACKGROUND OF THE INVENTION

The invention relates to a method for reducing the content of polychlorinated dibenzodioxins and -furans (PCCP/F) in the exhaust gas of chemical high-temperature processes, wherein, at least under the conditions under which the polychlorinated dibenzodioxins and -furans are formed in the processes, the processes include amides of organic acids.

In many thermal processes chlorinated aromatic compounds such as highly toxic dioxins, are formed which are discharged to the environment together with the exhaust gases. They should be removed from the exhaust gases as much as possible.

U.S. Pat. No. 4,793,270 discloses a method for reducing the dioxin formation during waste combustion wherein sulfur or sulfur compounds are added as catalyst poisons with nickel. These sulfur compounds however are changed by the method and may adversely affect the complicated reaction process. From U.S. Pat. No. 5,113,722, furthermore, the addition of sulfur-free compounds is known in connection with a waste combustion process, whereby no toxic sulfur dioxide is generated.

It is the object of the present invention to provide a method wherein the content of polychlorinated dibenzodioxins and -furans in the exhaust gas of chemical high temperature processes is minimized by the addition of compounds, which, essentially, do not change during the process.

SUMMARY OF THE INVENTION

In a method for reducing the content of polychlorinated dibenzodioxins and -furans in the exhaust gas of chemical high temperature processes handling process materials, amides or organic oxides are made available to the process under the conditions under which the polychlorinated dibenzodioxins and -furans are generated, which amides consist of at least one of the group consisting of amidosulfonic acid, hydroxyl amino sulfonic acid and sulfamide in an amount of 0.5 to 10% of the process material.

High-temperature processes (HI-P) are considered to be all processes, wherein during the process or part thereof temperatures of over 100° C. occur. Such processes are for example:

thermal waste utilization (waste combustion and waste pyrolysis)
generation of energy from raw materials and waste materials (deposition gas, settling slurries, compost, cable, medical residues, oil, gas, coal, wood)
tarr processing and production
crematory
combustion engines
cement fabrication
metal production and sintering
secondary metal processing
shredding
welding (gas welding, arc and spot welding)
fires and explosions
chemical high temperature processes
chlorine alkaline electrolyses
arc processes
small and large combustion plants The inhibitor is introduced as a liquid (suspension and/or solution of the active agent) or as a solid. Particularly in continuous processes, the inhibitor is added to the process itself or it is admixed to the material being processed (for example, fuel).

The sulfur is present as a special inorganic compound, added to the fuel. Special compounds such as inorganic sulfur- and sulfuric acid amides have been found to be effective for the dioxin reduction, for example sulfamid. These compounds are thermally essentially stable and pass through the reaction zone, without being decomposed, to the exhaust channel of the combustion plant, where they become effective in thermal dioxin formation zone of the exhaust gas channel.

The substances include nitrogen and/or sulfur, which are chemically bound; they were used in solid form. The following substances are particularly effective as inhibitors.

1. Amidosulfonic acid
2. Hydroxylaminosulfonic acid (HOSA)
3. Sulfamid (SA)

The invention will be described below in greater detail on the basis of exemplary embodiments.

The artificial waste fuel (RDF=Refuse derived fuel) was made by mixing representative substances in order to obtain a largely homogenous combustion sample. This fuel consisted of 35% cellulose and lignin, in order to simulate the paper content of household waste, 8.5% plastic materials, a small part of a sulfur chemical (tetramethylthio urea, TMTD), in order to simulate the rubber content, as well as 50% of potato starch and glycin as example for bio-decomposable substances. In addition, the artificial waste fuel contains small amounts of inorganic salts ($ALCl_3$, $CuCl_2$) as well as PVC as a source of chlorine. The substances were mixed to form a homogeneous powder and the substances listed above were admixed individually with a 10% weight content. In addition, the inhibitors were admixed with a weight content of between 1 and 10% and additionally amidosulfonic acid in an amount of 5%. In addition to the inhibitors listed above urea and elemental sulfur was examined.

The combustion was performed in a laboratory reactor, that is, a 140 cm quartz tube with a diameter of 4.5 cm. At the end of the quartz tube, quartz wool was used as a filter for collecting solid particles. The exhaust gases were subsequently conducted into two ice-cooled wash bottles including toluene. The airflow speed was controlled by a downstream rotometer.

The reactor had an electrical heater, which was adjusted to 1000° C. with an airflow of 1 l/min. 5 g of fuel were introduced into the heating zone of the reactor. Combustion occurred within 15 minutes. At the end of the combustion, the glass components were separated and the ash was removed from the quartz tube. The collected quartz wool and the glass collectors were separately extracted using toluene. The extracts were subjected to the common clean-up procedure for PCDD/F and then examined for dioxins by high-resolution gas chromatography and high-resolution mass spectroscopy (HRGC/HRMS). The results were evaluated with regard to the international toxicity equivalency (1-TEQ) values, which were then noted. All tests were performed twice to form an average value. The average I-TEQ value without additions was 52 pg/g fuel. An addition of urea has only little influence on the I-TEQ value; the value is 38 pg I-TEQ/g. The sulfur-containing substances such as amido sulfonic acid, hydroxy-amidosulfonic acid and sulfamid result in a significant reduction of the PCDD/F emission. Very low I-TEQ values, smaller than 1 pg/g fuel were observed with ASA, HOSA and SA. Combustion with pure sulfur results in a reduction of the I-TEQ-value to 1.8 pg/g fuel. The combustion of artificial waste fuel with 1 and 5% ASA results in a reduction of the dioxin values to 1.6 and 1.7 pg/g fuel. The results show that with the addition of 10% of emission reduction substances, a reduction of the dioxin concentration of 99% could be achieved. With an addition of 5%, the dioxin concentration reduction was 96%.

Waste streams may include substantial amounts of sulfur. Since sulfur dioxide is formed from the sulfur compounds of the fuel during combustion and is carried along with the exhaust gas, this compound can be utilized to prevent the formation of dioxins. The noxious material formed is subjected to a simple chemical conversion. To this end, it is absorbed in an aqueous solution of ammonia in the presence of oxidants (hydrogen peroxide, ozone, and oxygen with oxidation catalysts). The solution can be heated using waste heat, whereby the reaction is accelerated. The aqueous solution of sulfamid generated thereby can now be used in accordance with the invention as inhibitor.

To this end, for example, the following items can be utilized:

car tires sulfuric acid—dilute acids synthetic gypsum therapeutics waste

The PCDD/F reduction compounds (inhibitor) is admixed to the fuel in solid form. The mixing can occur in mixing drums and the reduction compounds are added to the fuel continuously before the combustion. In special cases, the PCDD/F reduction compounds can be admixed to the fuel in the form of an aqueous suspension before the combustion.

Waste materials, which are suitable as inhibitors are homogenized and added to the process in gaseous, liquid or solid form. Further mixing of the compounds (gaseous, liquid and solid) is possible. By varying the amount of dioxin suppressing chemicals, the reduction degree is optimized. The optimum amount depends on the plant type and the fuel and has to be determined empirically.

The amount of inhibitors added is in the area of 1 to 10% of the fuel. For an optimization of the inhibitor amount to be used tests should be made starting "from below" using increasing concentrations.

If the exhaust gas stream is rapidly conducted through the conversion zone together with the inhibitors (quenching), the PCDD/F concentration can be minimized. In this case, inhibitor amounts of 0.5 to 2% based on the weight of the fuel are sufficient.

The inhibitors may also be integrated already in the products so that with a later HAT-process no inhibitors need to be added.

The chemical design of such products is such that the product, which is later introduced into a HT-P, already includes the inhibitor. In this case, the addition amount of the inhibitor is maintained as low as possible and the inhibitor is integrated into the product in a selected localized fashion.

The inhibitors are highly temperature resistant. After combustion, they are bound to a large extent to the fly ash. They can therefore be separated from the fly ash and recycled to the process. In this way, the amount of inhibitors consumed can be reduced to a minimum. The recuperation and recycling of the inhibitors can be used advantageously in connection with many high temperature processes.

What is claimed is:

1. A method for reducing the content of polychlorinated dibenzodioxins and -furans in the exhaust gas of process materials subjected to chemical high temperature processes, comprising the steps of: providing under the conditions under which said polychlorinated dibenzodioxins and -furans are generated, amides of organic acids, which amides comprise at least one of the group consisting of amidosulfonic acid, hydroxylamino sulfonic acid and sulfamid in an amount of 0.5 to 10% of the process material.

2. A method according to claim 1, wherein said amides are admixed to the process material before the material is subjected to the chemical high-temperature process.

3. A method according to claim 1, wherein said amides are introduced into the process before the material reaches the state in which the polychlorinated dibenzodioxin and -furans are formed.

4. A method according to claim 1, wherein said amides are admixed in solid form or in a solution.

5. A method according to claim 1, wherein said amides are derived from sulfur-containing waste.

6. A method according to claim 1, wherein amides not consumed in the process are recycled to the process.

7. A method according to claim 1, wherein said chemical high-temperature process is a thermal waste processing process.

* * * * *